United States Patent
Johnson et al.

(10) Patent No.: US 10,344,138 B2
(45) Date of Patent: Jul. 9, 2019

(54) BIODEGRADABLE POLYMER RECYCLING

(71) Applicants: Anthony Francis Johnson, Ilkley (GB); Stephen Sik Fan Wong, Bradford (GB)

(72) Inventors: Anthony Francis Johnson, Ilkley (GB); Stephen Sik Fan Wong, Bradford (GB)

(73) Assignee: Aquapak Polymers Limited, Birmingham (GB)

( * ) Notice: Subject to any disclaimer, the term of this patent is extended or adjusted under 35 U.S.C. 154(b) by 13 days.

(21) Appl. No.: 15/513,195

(22) PCT Filed: Sep. 14, 2015

(86) PCT No.: PCT/GB2015/052651
§ 371 (c)(1),
(2) Date: Mar. 22, 2017

(87) PCT Pub. No.: WO2016/046520
PCT Pub. Date: Mar. 31, 2016

(65) Prior Publication Data
US 2017/0233543 A1    Aug. 17, 2017

(30) Foreign Application Priority Data
Sep. 22, 2014 (GB) .................................. 1416722.5

(51) Int. Cl.
*C08K 5/053* (2006.01)
*C08J 11/08* (2006.01)

(52) U.S. Cl.
CPC ............... *C08J 11/08* (2013.01); *C08K 5/053* (2013.01); *C08J 2300/16* (2013.01); *C08J 2329/04* (2013.01); *C08L 2205/025* (2013.01); *C08L 2207/20* (2013.01); *Y02W 30/701* (2015.05)

(58) Field of Classification Search
USPC ....................................................... 521/40.5
See application file for complete search history.

(56) References Cited

U.S. PATENT DOCUMENTS

| 5,885,907 A | 3/1999 | Honeycutt et al. |
| 2011/0126357 A1 | 6/2011 | Hartman et al. |

FOREIGN PATENT DOCUMENTS

| WO | WO2011094470 | 8/2011 |

OTHER PUBLICATIONS

Database WPI Week 200414, Thompson Scientific, London, GB; AN 2004-136513 XP002751099, & JP 2003 181830 A (Nippon Synthetic Chem Ind Co) Jul. 2, 2003 abstract.

*Primary Examiner* — Terressa Boykin
(74) *Attorney, Agent, or Firm* — Welsh Flaxman & Gitler LLC

(57) ABSTRACT

A biodegradable material is capable of recovery and recycling by dissolution in water at a temperature 40° C. or higher. The material is insoluble in water at 25° C. The material includes one or both of virgin or scrap polyvinyl alcohol material resultant from manufacture of an article composed of polyvinyl alcohol, or a waste stream containing polyvinyl alcohol material.

5 Claims, No Drawings

BIODEGRADABLE POLYMER RECYCLING

This invention relates to articles made from recycled or recyclable biodegradable polymeric material and to a method of recovery of polymeric material from waste material containing the polymer. The invention relates particularly but not exclusively to articles made from polyvinyl alcohol or copolymers or blends thereof and a method of recovery of waste material comprising polyvinyl alcohol.

Recovery and recycling of polymeric materials has widespread economic benefits and has to be a concern whenever high tonnages of any given polymeric product are introduced to the marketplace. Polyolefins such as polyethylene, polypropylene or polyvinylchloride may be separated from a waste stream by flotation processes. Higher value polymeric materials such as polyethylene terephthalate may be separated manually or using spectroscopic detection. Biodegradable polymers cannot be readily separated and therefore they remain as contaminants in waste streams, preventing efficient recycling of other polymers such as polyolefins.

According to a first aspect of the present invention there is provided a biodegradable material capable of recovery and recycling by dissolution in water at a temperature 40° C. or higher, the material being insoluble in water at 25° C.; wherein the material comprises one or both of:

virgin or scrap unmodified polyvinyl alcohol material resultant from manufacture of an article composed of unmodified polyvinyl alcohol, the material having a degree of hydrolysis of at least 98 mol %, or a waste stream containing polyvinyl alcohol material having a degree of hydrolysis of at least 98 mol %.

The waste material may be virgin or scrap material from manufacture of pellets, film blowing or film shaping. A particular application of the material is for the manufacture of carrier bags, such as used by supermarkets and other retail outlets, or packaging film in general. Alternatively, the waste stream may result from a recovery process at a commercial or municipal waste treatment plant.

Polyvinyl alcohol which may be used in accordance with this invention is preferably unmodified in the sense that the polymer has substantially no functionality besides hydroxyl and acetate groups. The presence of functional groups such as sulfonyl groups which increase solubility in cold water is particularly disadvantageous. Polymers of this invention do not comprise a bilayer or multilayer film.

The material preferably has sufficient wet strength when exposed to rain to allow manufacture of an article which is useful in normal weather conditions, but which facilitates recycling as disclosed in this specification.

The properties of a preferred material for use in carrier bag manufacture are shown in Table 1. The material may have an equilibrium water content of 1.5% by weight dependant on ambient humidity and temperature conditions.

TABLE 1

| Carrier Bag Criteria - Polyvinyl Alcohol (PVOH) carrier bag film | | | |
|---|---|---|---|
| Test type | Units | Typical polyethylene carrier bag | PVOH carrier bag |
| Tear M direction | mN | 80-100 | 2500 +/− 200 |
| Tear C direction | mN | 500-1000 | 3000 +/− 250 |
| Tensile M Direction | N/15 mm | 8-10 | 50 +/− 20 |
| Tensile C Direction | N/15 mm | 15-20 | 60 +/− 20 |
| Puncture resistance | N | 20-25 | 70 +/− 20 |
| Dart impact | g | 250 g | 110 +/− 20 |

A rapid rate of dissolution, for example 1 minute or less, is important to facilitate use in a recycling process and preferably allows adaptation of existing recycling plant without diminishing throughput or processing time.

The material may further comprise one or more additives which enhance the processing behaviour of the polyvinyl alcohol (PVOH) into the form of pellets or the pellets into film by blow moulding. Additives may include plasticizing agents for the PVOH. These may be present on amount from 5-50 wt % depending on the chemical nature of the additive or the presence of water. Plasticizers when fully incorporated into the PVOH may affect the extent of crystallinity of the polymer and may lower the temperature at which pellets and blown film may be manufactured. Various plasticizers may be used dependent on the solubility in water, the likely impact on the anaerobic digestion and composting processes and also any effect on the physical properties of blown film. Plasticisers may be selected from the group consisting of: polyhdric alcohols, polyethylene glycols, glycerol, diols or triols, for example, propylene glycol, ethylene glycol, polyethylene glycol, glycerol mannitol, pentaerythritol, sorbitol, trimethylolpropane or mixtures thereof. Glycerol is a preferred plasticizer. It is readily available at a low cost and gives a high energy output in anaerobic digestion waste disposal processes.

Polyvinyl alcohol is usually made by hydrolysis of polyvinyl acetate. The polymer for use in this invention may comprise at least 98% polyvinyl alcohol with about 2% or less, of unhydrolysed polyvinyl acetate. A hydrolysis degree of 98.5%, 98.8% or higher may be employed. This material has distinctive properties making it suitable for use in accordance with the present invention, unlike polyvinyl alcohol materials with a degree of hydrolysis less than 98%, especially less than 97%, more preferably less than 95%.

The polymer according to this invention may have a molecular weight of 10,000 to 200,000, preferably between 15,000 and 100,000, and especially between 16,000 and 85,000. It is particularly advantageous to use a blend of two or more polymers within this range. For example a blend comprising 70% 70,000 to 90,000 MW:30% 10,000 to 20,000 MW. Preferably a 70% 85,000 MW:30% 16,000 MW blend is used to provide superior rheological properties for processing, for example pellet manufacture, extrusion and blow moulding.

The scrap polyvinyl alcohol material may comprise waste material from manufacture of polyvinyl alcohol or from processing of articles comprising polyvinyl alcohol. For example the material may comprise off cuts from cutting or heat stamping of film products such as bags or other packaging. The waste material may include impurities such as pigments, inks, dyes, or plasticisers which can be removed by the proposed precipitation recovery method.

Polyvinyl alcohol is generally hydrophilic and absorbs water from the atmosphere or upon immersion with a consequential change in mechanical properties. However, the material of this invention is less susceptible to change when exposed to moisture than polyvinyl alcohols with lower degrees of hydrolysis. The material is therefore more suitable for use in manufacture of everyday consumer products such as carrier bags and other packaging items.

A particular application of the material of this invention is in manufacture of carrier bags, food packaging film and other high volume articles which are used on a sufficient scale to justify recovery and recycling from manufacturing processes and waste processing plants.

The material preferably has sufficient wet strength when exposed to water at ambient temperatures for example rain to allow manufacture of an article which is useful in normal weather conditions but which can be recovered and recycled. Carrier bags in accordance with the invention may be used in wet weather conditions where moisture may be absorbed without catastrophic impairment of the mechanical properties which may be required for normal use.

The material is preferably rapidly soluble in water at temperatures over about 40° C., typically about 60° C. to about 90° C. A sheet of thickness 15 μm may dissolve completely in water at 70° C. within a period of less than 1 minute. The rate of dissolution depends on the film thickness.

The heated water may be applied to the waste polymer by water jet spraying or steam jets so that a minimum amount of water is required. The water may be repeatedly applied to the material until a sufficiently concentrated solution of polyvinyl alcohol is obtained. A concentration of 1% to 50%, typically about 10%, may be employed. The dissolution process may be operated in a batch or continuous manner and may be fully automated using feedback control from a range of measurement devices including such as spectrometers and refractometers. A cold water pre-wash may be used to clean the material before recovery of the polymer.

A high rate of dissolution is important to facilitate use in a recovery and recycling process and allows continuous extraction methods to be employed in existing recycling plants without diminishing throughput or processing time. Thin film products have a physical form which lend themselves to rapid dissolution. Thicker section articles require more vigorous and higher temperature dissolution processes to achieve a rapid dissolution rate.

Preferably the material may be manufactured into an article consisting of sheet or film material. Packaging film, sheeting and wrapping materials, particularly food wrapping and carrier bags of the kind used in supermarkets. Use in manufacture of carrier bags is particularly advantageous.

The aqueous polyvinyl alcohol solution produced by dissolution can be used either directly or may be reformulated, for example, for the manufacture of adhesives, for use as a binding agent for powders and aggregates, as a coating material, for film casting or as a primer composition for building or construction materials.

In a preferred process, the polyvinyl alcohol can be recovered by precipitation from the solution using an appropriate precipitating agent. This process not only allows the recovery of the polymer through the selection of an appropriate precipitant but may also allow separation from the recovered polymer of impurities or other components or unwanted additives, such as pigments or printing inks such as may be found in a finished product such as a carrier bag. Selection of an appropriate precipitating agent can facilitate isolation of the polymer from unwanted impurities.

According to a second aspect of the present invention a process for recovery of waste polymer comprises the steps of:

collecting waste polymer material including unmodified polyvinyl alcohol having a degree of hydrolysis of at least 98 mol %;

dissolving the unmodified polyvinyl alcohol in water at a temperature of 60° C. or greater to give a solution of the polyvinyl alcohol;

separating any residual solid phase to form a filtered solution; either reformulating the polyvinyl alcohol solution for a secondary use or mixing the filtered solution with a precipitant to recover the polyvinyl alcohol as a precipitate; and separating the precipitated polyvinyl alcohol for re-formulating and recycling.

The precipitant may be an organic liquid which is miscible with water but is a non-solvent for polyvinyl alcohol.

The preferred precipitants are low cost and readily available materials including: alcohols, or ketones, for example methanol or acetone. Methanol is preferred. The use of mixed non-solvents maybe appropriate. However, a simple precipitant such as methanol is preferred as recovery of methanol for re-use is readily achieved. This is an important environmental and economic consideration.

An amount of precipitant may be 50% to 100%, preferably 50% to 70% by weight of the aqueous solution.

The precipitation process may be controlled in order to regulate the physical form of the recovered polymer. Variable parameters which allow such control are the rate of addition and mixing of the aqueous polyvinyl alcohol solution with the precipitant, stirring rate, precipitant type and temperature. Depending on the form of the precipitate the solid phase may be separated by filtration or centrifugation to provide recovered solid phase polyvinyl alcohol. Precipitation may be controlled to provide the solid in suitably dimensioned particles, for example, as a powder or small granules. The precipitation process can be a batch process or continuous process, but preferably is continuous to facilitate use in an existing waste handling plant.

The polyvinyl alcohol may be recovered from the solution by alternative methods, for example by reduction in temperature of the solution or evaporation.

The recovered polyvinyl alcohol may be used directly or reformulated by extrusion into a standard form such as pellets of the type commonly used by the industry for the manufacture of films by blow moulding, or for manufacture of other engineering components or manufactured articles using conventional injection or extrusion apparatus.

A polyol, preferably glycerol may be added as a plasticiser to facilitate conversion of the recovered polyvinyl alcohol into film or other products. Glycerol having a high energy output upon bio-digestion results in a larger energy output for a given mass to be achieved in an anaerobic digestion process.

The process may further comprise the step of recovery of the solvent from the water by distillation.

The process of the present invention confers several advantages. Carrier bags or other products may be made from a biodegradable and recyclable polymer without detriment to the mechanical properties. A considerable environmental benefit may be obtained. Existing recycling plants may be readily adapted. The material may be finally disposed of by anaerobic digestion, for example to permit disposal of wrapped waste foods. The biodegradable properties are advantageous in marine or aquatic environments in comparison to other polymers such as polyolefins.

In a process in accordance with this invention the dry mixed film waste including PVOH having a degree of hydrolysis of at least 98% is mixed with hot water which may have a temperature of 5-100° C., preferably 60-80° C.

The heated water is sprayed onto the polymer material and may be stirred to provide countercurrent mixing. A residence time of 1-5 minutes may be provided, following which the material is filtered through a screen to provide a solution containing the polyvinyl alcohol. The concentration of the solution may depend on the proportion of polyvinyl alcohol in the waste material. The solution may be collected and re-sprayed one or more times onto the waste material in order to increase the concentration. A concentration of 1%-50%, preferably 5%-30%, typically 10% of polyvinyl alcohol may be employed. A high concentration may not be preferred as the solution may become too viscous for convenient handling. The solution may also contain any plasticizer, for example glycerol.

The solution may be used directly for manufacture of an adhesive or coating composition.

Alternatively, following filtration of the dissolved polyvinyl alcohol, the filtered solution is added to a container and mixed with a precipitant which is a non-solvent for polyvinyl alcohol having a degree of hydrolysis greater than 98%. Preferred precipitants include methanol, ethanol and acetone. An amount of 5%-50% by weight, preferably about 10% by weight of methanol, may be employed. The solution may be seeded with crystalline polyvinyl alcohol. The particle size and morphology may be controlled by adjusting the temperature, rate of addition and mixing of the precipitant.

Alternatively, the polyvinyl solution may be rapidly cooled in order to precipitate the polymer. As a further alternative, water may be removed by evaporation. This may be particularly preferred if the waste polyvinyl alcohol is pure, for example comprising offcuts from a carrier bag or film manufacturing process.

The precipitate may be separated by filtration or centrifugation. A continuous process is preferred.

Following separation the solid polyvinyl alcohol may be separated by granulation to form a coarse powder, for example having a dimension of 0.5-3 mm. Following granulation the material will comprise a polyvinyl alcohol having a degree of hydrolysis of 98% or greater and may be co-extruded with a plasticizer in order to facilitate subsequent processing.

The invention claimed is:

1. A process for recovery of a waste polymer comprising the steps of:
   collecting waste polymer material including unmodified polyvinyl alcohol having a degree of hydrolysis of at least 98 mol %;
   dissolving the unmodified polyvinyl alcohol in water at a temperature in the range of 60° C. or greater to give a solution of the polyvinyl alcohol;
   separating any residual solid phase to form a filtered solution;
   either reformulating the unmodified polyvinyl alcohol solution for a secondary use or mixing the filtered solution with a precipitant to recover the unmodified polyvinyl alcohol as a precipitate; and separating the precipitated unmodified polyvinyl alcohol for re-formulating and recycling, wherein the precipitant is selected from the group consisting of alcohols, ketones and mixtures thereof.

2. The process as claimed in claim 1, wherein the precipitant is ethanol or acetone.

3. A process for recovery of a waste polymer comprising the steps of:
   collecting waste polymer material including unmodified polyvinyl alcohol having a degree of hydrolysis of at least 98 mol %;
   dissolving the unmodified polyvinyl alcohol in water at a temperature in the range of 60° C. or greater to give a solution of the polyvinyl alcohol;
   separating any residual solid phase to form a filtered solution;
   either reformulating the unmodified polyvinyl alcohol solution for a secondary use or mixing the filtered solution with a precipitant to recover the unmodified polyvinyl alcohol as a precipitate; and separating the precipitated unmodified polyvinyl alcohol for re-formulating and recycling, wherein the amount of the precipitant is in the range of 50% to 100% by weight of the aqueous solution.

4. The process as claimed in claim 3, wherein the amount of the precipitant is in the range of 50% to 70% by weight of the aqueous solution.

5. A process for recovery of a waste polymer comprising the steps of:
   collecting waste polymer material including unmodified polyvinyl alcohol having a degree of hydrolysis of at least 98 mol %;
   dissolving the unmodified polyvinyl alcohol in water at a temperature in the range of 60° C. or greater to give a solution of the polyvinyl alcohol;
   separating any residual solid phase to form a filtered solution;
   either reformulating the unmodified polyvinyl alcohol solution for a secondary use or mixing the filtered solution with a precipitant to recover the unmodified polyvinyl alcohol as a precipitate; and separating the precipitated unmodified polyvinyl alcohol for re-formulating and recycling, wherein the unmodified polyvinyl alcohol has substantially no functionality besides hydroxyl and acetate groups.

* * * * *